US011634352B2

(12) United States Patent
Glacki et al.

(10) Patent No.: US 11,634,352 B2
(45) Date of Patent: Apr. 25, 2023

(54) METHOD AND APPARATUS FOR SHAPING A GLASS WORKPIECE WITH MINIMAL LUBRICATION

(71) Applicant: SCHOTT PHARMA AG & CO. KGAA, Mainz (DE)

(72) Inventors: Alexander Glacki, Mainz (DE); Robert Kruse, Feldkirch (AT); Doris Moseler, Budenheim (DE); Michael Waschbüsch, Undenheim (DE); Jörg Witte, Pfungstadt (DE); Robert Frost, Eggersriet (CH)

(73) Assignee: SCHOTT PHARMA AG & CO. KGAA, Mainz (DE)

( * ) Notice: Subject to any disclaimer, the term of this patent is extended or adjusted under 35 U.S.C. 154(b) by 586 days.

(21) Appl. No.: 16/246,324

(22) Filed: Jan. 11, 2019

(65) Prior Publication Data

US 2019/0144326 A1 May 16, 2019

Related U.S. Application Data

(63) Continuation of application No. PCT/EP2017/067288, filed on Jul. 10, 2017.

(30) Foreign Application Priority Data

Jul. 12, 2016 (DE) .......................... 102016112730.2

(51) Int. Cl.
*C03B 40/027* (2006.01)
*C03B 23/09* (2006.01)
(52) U.S. Cl.
CPC .......... *C03B 40/027* (2013.01); *C03B 23/092* (2013.01); *C03B 23/095* (2013.01); *C03B 2215/06* (2013.01); *C03B 2215/50* (2013.01)

(58) Field of Classification Search
CPC . C03B 40/027; C03B 23/095; C03B 2215/06; C03B 23/09–092;
(Continued)

(56) References Cited

U.S. PATENT DOCUMENTS 3,342,575 A 9/1967 Dichter
3,368,588 A * 2/1968 Meyer .................. C03B 23/097
138/178

(Continued)

FOREIGN PATENT DOCUMENTS

CN 201676801 12/2010
CN 102513480 6/2012
(Continued)

OTHER PUBLICATIONS

CN 203726262 U (Li et al.) Jul. 2014 (English language machine translation). [online] [retrieved on Feb. 7, 2022]. Retrieved from: Espacenet. (Year: 2014).*

(Continued)

*Primary Examiner* — Erin Snelting
(74) *Attorney, Agent, or Firm* — Ruggiero McAllister & McMahon LLC

(57) ABSTRACT

An apparatus for shaping a workpiece made of glass using minimum lubrication is provided. The apparatus includes device for heating the workpiece, a shaping station with at least one forming tool for shaping the workpiece, and at least one spray nozzle for applying an oil as a lubricant onto the surface of the forming tool. The forming tool exhibits heat dissipation such that the temperature on the contact surface of the forming tool during the shaping process is kept below 300° C. The amount of oil dispensed by the spray nozzle per forming step and application instance is less than 0.1 g.

24 Claims, 5 Drawing Sheets

(58) Field of Classification Search
CPC .......... C03B 23/096; B05B 1/02; B05B 1/28; B05B 1/3402; B05B 7/0876; B05B 12/18
See application file for complete search history.

(56) References Cited

U.S. PATENT DOCUMENTS

| | | | |
|---|---|---|---|
| 3,424,570 A | | 1/1969 | Couquelet |
| 4,001,125 A | | 1/1977 | Newton, III |
| 4,391,620 A | | 7/1983 | Geisel |
| 4,565,082 A | | 1/1986 | Heath |
| 4,578,099 A | | 3/1986 | Hübner |
| 4,579,574 A | * | 4/1986 | Sugie .................... C03B 40/027 65/170 |
| 5,580,365 A | * | 12/1996 | Maiden ................. C03B 23/095 65/104 |
| 6,640,587 B1 | | 11/2003 | Hollesen |

FOREIGN PATENT DOCUMENTS

| | | | |
|---|---|---|---|
| CN | 203726262 U | * | 7/2014 |
| CN | 104985477 | | 10/2015 |
| DE | 642907 | | 3/1937 |
| EP | 0074200 | | 3/1983 |
| EP | 1754688 | | 2/2007 |

OTHER PUBLICATIONS

English translation of Written Opinion dated Oct. 27, 2017 from corresponding International Application No. PCT/EP2017/067288, 5 pages.
English translation of International Preliminary Report on Patentability dated Jan. 24, 2019 from corresponding International Application No. PCT/EP2017/067288, 7 pages.
English translation of International Search Report dated Oct. 27, 2017 from corresponding International Application No. PCT/EP2017/067288, 3 pages.

* cited by examiner

METHOD AND APPARATUS FOR SHAPING A GLASS WORKPIECE WITH MINIMAL LUBRICATION

CROSS REFERENCE TO RELATED APPLICATIONS

This application is a continuation of international application filed on PCT/EP2017/067288 filed Jul. 10, 2017, which claims benefit under 35 USC § 119 of German Application 10 2016 112 730.2 filed Jul. 12, 2016, the entire contents of both of which are incorporated herein by reference.

BACKGROUND

1. Field of the Invention

The invention relates to a method and to an apparatus for shaping glass workpieces in a hot forming process. More particularly, the invention relates to a method and an apparatus for such a forming or reshaping process which allow to considerably reduce the use of lubricants.

2. Description of Related Art

Methods in which glass articles are produced by a reshaping process from a workpiece that is also referred to as a semifinished product are known from the prior art. For example vials as used for pharmaceutical applications are produced from glass tubing by heating a short portion at one end of the tube up to a forming temperature of the glass and forming it into the desired shape in one or more forming steps using suitable forming tools. The internal geometry is usually formed by mandrels that are introduced into the end of the tube. In this case, a surface rotation velocity of the mandrel is lower than that of the workpiece during the shaping process. According to a variant, the mandrel is fixed and the workpiece rotates during the shaping process. The shape and dimensions of the mandrel define the internal geometry of the glass vial. The reshaping is effected by external forming tools urging the glass tube against the mandrel and at the same time shaping the outer surface of the glass tube. In this case, the glass tube and/or the outer forming tool is rotated. Preferably, the reshaping is performed in a so-called rotary machine. The reshaping can be achieved in several steps, i.e. at a plurality of stations of the rotary machine.

During contact with the tool, the glass workpiece is cooled by the forming tools. If necessary, the workpiece has to be reheated between the forming steps. The temperature is controlled such that after the last forming step the glass reaches a temperature at which the workpiece is dimensionally stable.

Due to the contact with the hot glass, the forming tools, in particular the mandrel, are exposed to high temperature loads. Furthermore, direct contact of the forming tools with the hot glass has to be avoided, since this would lead to adhesion of the glass on the surface of the forming tools. This is especially true when the mandrel has a very high surface temperature. From the prior art, several options are known for separating the glass and the surface of the forming tools.

For example, DE 101 57 258 B4 describes a device for hot forming glasses, in which the mandrel as an inner forming tool is separated from the glass surface by a gas film. For this purpose, the mandrel consists of a gas-permeable material. Gas is introduced into the mandrel via an integrated gas feed line and exits at the surface thereof, thereby forming a gas film which separates the surface of the mandrel from the glass.

However, in the device described in DE 101 57 258 B4, the mandrel must necessarily consist of a porous gas-permeable material. The solution described there can therefore not be applied to devices comprising conventional mandrels that are usually made of a solid material.

DE 642907 A describes a method for producing glass tubes with a precise inner shape and states that a mandrel that used for shaping is enveloped by a release agent, which is preferably achieved by a permanent inflow of the release agent from above.

EP 0074200 A1 and U.S. Pat. No. 4,578,099 A each discloses devices in which a mold is used for producing metal or glass moldings, for example. Both documents relate to press-blow machines or similar systems which can be used for producing hollow glass bodies, for example. In the devices described in these documents, a certain amount of molten material, for example glass, is initially fed into a mold which is covered with a liquid. A coating, in particular on internal forming tools, is not apparent from these documents.

The glass hot shaping processes described above usually use a lubricant which is also referred to as a release agent, for example an oil or a paste. In this case, the lubricant is applied to the forming tools in the intermediate clock cycles of the shaping process in which the tools are not in contact with glass, for example by applying the lubricant onto the forming tools by spraying, sprinkling, flashing, or flushing. In this case, the respective tool is relubricated prior to each glass contact. In order to prevent adhesion of or damage to the glass due to direct tool contact, large amounts of oil have hitherto been necessary. The amount of oil used is significantly more than 0.1 g per tool and clock cycle. While these amounts of oil ensure that the glass and the forming tool do not adhere to each other, lubricant residues may seriously contaminate the product being made and the manufacturing equipment. Furthermore, reaction products of the lubricants are being produced due to the high temperatures during the shaping process, which might become incorporated in the shapeable glass or bond to the glass, which also leads to cosmetic defects. Moreover, large amounts of oil not only result in contamination of the product that is being produced, but also in a contamination of the forming tools, manufacturing equipment and production environment. For example, due to the large amounts of oil the equipment may become contaminated by oil running off the tool.

SUMMARY

An object of the invention is to provide an apparatus for shaping a glass workpiece, in particular so as to adopt an at least partially defined inner geometry and preferably also a defined outer geometry, which apparatus does not exhibit or mitigates the drawbacks of the prior art described above. Another object of the invention is to provide a method of shaping glass.

The apparatus of the invention for shaping a workpiece made of glass comprises the following components: a device for heating the workpiece; a shaping station with at least one forming tool for shaping the workpiece; wherein the forming tool preferably exhibits heat dissipation; wherein the temperature on the contact surface of the forming tool during the shaping process is maintained below 300° C.; and at least one spray nozzle for applying an oil as a lubricant onto the surface of the forming tool, in particular onto a shaping or contact surface of the forming tool, wherein the amount of oil dispensed per forming step and application instance is adjustable to be less than 0.1 g.

Preferably, the shaping station comprises at least an inner and an outer forming tool for shaping the inner and outer lateral surfaces of the workpiece. The inner forming tool in particular exhibits heat dissipation so that the temperature of the inner forming tool during the shaping of the workpiece is less than 300° C. An inner forming tool in the form of a mandrel has been found to be particularly advantageous for shaping tubular workpieces.

Here, heat dissipation refers to the ability of a body, in particular of the inner forming tool, or mandrel, to dissipate heat, in particular based on the respective thermal conductivity of the inner forming tool, or mandrel, for example from shaping or contact surfaces to a further body, such as a seat and/or to a cooling medium, preferably to a cooling liquid.

In preferred embodiments, the spray nozzle can be used to apply the oil onto the surface, in particular the contact surface of the forming tool, in intermediate clock cycles of the shaping process.

Preferably, the spray nozzle of the apparatus is configured so as to form a directionally stable oil-gas jet. An arrangement of the spray nozzle within the apparatus such that a vertical angle γ between the spray nozzle and the surface of the inner forming tool, in particular the surface of the mandrel, ranges from 0 to 60°, and such that a horizontal angle α with the surface of the inner forming tool ranges from −85° to 85° has been found to be particularly advantageous.

In each of FIGS. 2a and 6, a flattened area 56, 57 can be seen, where the otherwise substantially cylindrical contact surface 18 merges into a respective planar section. The vertical angle γ between the spray nozzle 2, 2a, 2b and the surface of the inner forming tool 1 is defined relative to the plane of this flattened area 56, 57. As can be seen in particular from FIG. 6, this vertical angle γ extends in a plane perpendicular to the y-direction and thereby defines a rotation about the y-direction as an axis of rotation, with a positive sign for a rotation in the direction of the arrow as indicated about the y-axis in FIG. 6.

The shaping of the workpiece into the specific shape or to the specific dimensions of the desired product may be an immediate result of the shaping process. However, the shaping of the workpiece into the product shape may as well be achieved by a plurality of different shaping processes or forming steps, each comprising an at least partial shaping of the workpiece. When manufacturing glass bottles, glass vials, or glass containers, for example, the apparatus and methods described herein may also comprise the shaping of the neck and finish geometry of the vial, in addition to the inner and outer lateral surfaces of the workpiece.

The apparatus is in particular configured for shaping a tubular workpiece. In this case, the inner and outer lateral surfaces, in particular the effective diameter thereof, i.e. the diameter effective and shape-defining during the shaping, are essentially determined by the geometry of the tube. In a preferred embodiment, the inner forming tool is provided in the form of a mandrel. Such an apparatus is particularly useful for producing glass containers such as pharmaceutical primary packaging, e.g. vials, cartridges, or syringes, by reshaping glass tubing. The outer diameter and therefore the outer circumference of the respective tube or tubular portion to be reshaped of the workpiece to be reshaped can range from about 16 to 45 mm in the case of vials, and the wall thickness thereof can be from 1 to 1.2 mm prior to the shaping, and, preferably, mandrels of about 5 to 20 mm in diameter are used, the mandrel's diameter here being the diameter of the substantially cylindrical contact surface of the mandrel that comes into contact with the glass of the workpiece during the shaping.

However, depending on the product, this diameter of the contact surface may vary greatly and may have significantly smaller diameters in the case of cartridges and syringes, for example, of even only about 1 mm.

Advantageously, the spacing between the spray nozzle and the surface of the forming tool is from 1 to 50 mm, preferably from 10 to 30 mm.

Particularly preferably, the spray nozzle is a coaxial spray nozzle, and/or the oil-gas jet has an opening angle of >1°, preferably in a range from 2 to 10°, most preferably from 2 to 6°.

Homogeneity of the application can be increased if the apparatus comprises a plurality of spray nozzles for each inner forming tool, i.e. for each mandrel, preferably two spray nozzles per mandrel. The one or more spray nozzle(s) may be firmly installed in the shaping station. In a further preferred embodiment, the one or more spray nozzle(s) are not installed in stationary manner in the shaping station and can be driven towards or close to the mandrel in the intermediate clock cycles of the shaping process.

Lubricants that may be used in the apparatus according to the invention include any oils having a viscosity of less than 600 $mm^2$/s and a flash point and/or pyrolysis point of >200° C., preferably >250° C. Thus, the same oils as in the prior art standard processes can be used here.

The apparatus permits to reduce the amount of lubricant or oil that is used to less than 0.1 g of oil per forming step and application instance. Thus, the apparatus constitutes a minimum lubrication system, wherein minimum lubrication in the sense of the invention means an application of less than 0.1 g of lubricant per forming step and application instance. According to a preferred embodiment, the application per forming step and clock cycle may be reduced to less than 0.01 g or even less than 0.001 g for minimum lubrication. Due to the low amount of applied lubricant it is possible to significantly reduce contamination of the product, of the forming tools, and of the production environment, while at the same time, however, a sufficient lubricating effect is achieved in the apparatus of the invention.

In preferred embodiments, this can be ensured in particular by the respective individual components of the apparatus and in particular by their interaction in an advantageous manner as will in particular be apparent from the independent claims, while preferred further refinements are moreover apparent from the dependent claims.

The forming tool is configured such that, due to heat dissipation, the temperature at the surface of the forming tool, in particular at the contact surface, is not more than 300° C. Here, contact surface of the forming tool refers in particular to that part of the forming tool which comes into contact with the hot glass of the workpiece to be shaped during the forming or reshaping process. The surface temperature of this contact surface is measured here in the interior of the forming tool, i.e. below the surface, in particular the contact surface, using a thermocouple. The distance between the surface and the thermocouple during the measurement is between 0.5 mm and 1 mm, which allows in particular very exact temperature measurements.

The heat dissipation preferably ensures that the temperature at the surface of the forming tool is lower than the evaporation temperature and/or than the flash point or pyrolysis temperature of the employed lubricant. Forming tool surface temperatures that are lower by at least 10° C. or even by at least 50° C. than the evaporation temperature and/or pyrolysis temperature of the lubricant have proven to be particularly advantageous in view of a low contamination of the product and process environment and in view of a smallest possible amount of applied lubricant.

Advantageously, the amount of oil dispensed per forming step and application instance can be less than 0.01 g, and preferably less than 0.005 g, and most preferably less than 0.001 g.

Likewise advantageously, the duration of the spraying process, in particular of a spray burst for spray-application of the oil can be less than 0.5 s, preferably less than 0.3 s, most preferably 0.1 to 0.2 s.

In one preferred embodiment, the inner forming tool, in particular the mandrel, consists of multiple pieces, at least of two pieces, and an effective outer diameter thereof, that is the effective outer diameter of the contact surfaces during the shaping, is adjustable by relative movement of at least two halves of the inner forming tool, in particular the mandrel. This allows to precisely form even grooves or elevations, in particular lip-like or annular elevations.

According to one embodiment of the invention, the heat dissipation is passive. In this embodiment, the inner forming tool, entirely or at least partially, is made of a material that exhibits high thermal conductivity. Preferably, a material having a thermal conductivity of at least 400 W/mK is used for the forming tool, and/or a material that contains copper or is made of copper. In this case, the inner forming tool, in particular the mandrel, may have a core comprising a material with a thermal conductivity of at least 400 W/mK and/or copper.

Advantageously, for this purpose, the inner forming tool, in particular the mandrel, may be held in a seat in such a manner that heat can be removed therefrom and/or supplied thereto, in particular through a heat exchange surface of the inner forming tool, in particular mandrel, which is in direct mechanical contact with an associated heat exchange surface of the seat. Alone by thermal conduction it is thus possible to remove sufficient heat from the inner forming tool, in particular the mandrel, so that it reliably has the temperatures described herein, at least on the respective forming tool surface which is also referred to as the contact surface.

Alternatively or additionally, heat dissipation from the forming tool may be accomplished actively. For example, the forming tool may be flushed inside by a cooling medium, such as a cooling liquid. Cooling liquids such as water or oils have proven to be particularly suitable. Cooling may also be accomplished by air or the use of aerosols. In order to provide the desired cooling capacity, it is possible to adjust the temperature of the cooling medium and/or flow rate thereof. Preferably, a cooling medium at room temperature is used and its flow rate is adjusted to a value which reliably maintains the desired temperature of the inner forming tool, in particular of the contact surface of the mandrel, at the values described herein.

In particular with active cooling, the temperature on the surface, in particular the contact surface of the forming tool can be less than 250° C. or even less than 230° C. during the shaping process, in particular it can be lowered to this temperature or be adjustable to such temperatures. It is even possible to lower the temperature to temperatures below 200° C. This allows to employ a large variety of different lubricants.

In combination with the small amount of applied lubricant according to the invention, the contamination resulting on the forming tool due to pyrolysis products, products of combustion or reduced lubricant residues is reduced, which has an advantageous impact on the intervals of cleaning cycles that are necessary.

Since heat is dissipated effectively in the forming tool, it is possible to adjust the temperature on the surface of the forming tool, in particular at the respective contact surface during the shaping process, such that the surface temperature of the forming tool is below the flash point and/or pyrolysis temperature of the employed lubricant. This ensures that the applied lubricant does not burn or decompose. This also minimizes the smoke development associated with decomposition or combustion of the lubricant. The strong reduction of smoke development reduces contamination of the production environment and results in a reduced strain on production employees.

Another advantage of minimum lubrication of the forming tool is that always fresh "clean" oil is used for lubrication and is not reused in the cycle. This avoids impurities, particles, and/or alkali compounds from accumulating in the oil. In this way it is ensured that the properties of the lubricant remain consistent. This guarantees a long-term stable reproducibility of the minimal lubrication.

Furthermore, the reduction of smoke development significantly reduces contamination of the products. Therefore, according to a refinement of the invention, it is possible to shorten the duration of the annealing process following the production process. In this process, the glass products, after having been reshaped, are heated in an annealing lehr at temperatures ranging from 560 to 570° C., for example. Thus, the temperatures in the annealing lehr are generally above the pyrolysis temperature of the lubricant and above the pyrolysis temperature of the decomposition products of the lubricant caused during the shaping process. Thus, not only any existing stresses in the glass are reduced in the annealing lehr, but in addition the residues of the lubricant on the glass are removed by pyrolysis. Since the amount of such residues is considerably reduced with the apparatus of the invention, it is possible to reduce the duration of the annealing process.

The apparatus of the invention permits to significantly reduce the amount of lubricant used in the shaping process. In addition to the above-described reduction of combustion and pyrolysis processes of the lubricant by heat dissipation in the forming tool, a uniform and selective application of the lubricant onto the surface of the inner forming tool is possible.

Application of the lubricant is achieved using at least one spray nozzle per forming tool. This application is preferably effected in the intermediate clock cycles, wherein an intermediate clock cycle is understood to mean the time interval between two shaping processes.

According to a preferred embodiment, the spray nozzle is designed such that, upon spraying, a directionally stable oil-gas jet is formed. Here, directionally stable oil-gas jet also means an aerosol in a defined spray cone. This allows precise positioning and uniform distribution of the oil on the surface of the inner forming tool. In particular uncontrolled spread of an oil-gas aerosol is prevented by the spray nozzle. Preferably, compressed air is used as the gas for producing the oil-gas jet.

Coaxial spray nozzles achieve a directionally stable oil-air jet by emitting jacket spray air for example. However, other nozzle systems may be used as well, for example nozzles with an annular nozzle arrangement, provided that they are capable of achieving a directionally stable oil-gas jet with uniform distribution of the oil particles.

It has been found to be particularly advantageous if the spray nozzle is arranged within the apparatus in such a manner that a vertical angle γ in a range from 0 to 60° and a horizontal angle α in a range from −85° to −85° is defined between the nozzle and the surfaces to be wetted of the forming tool. With this geometric arrangement of the spray nozzle and the surface to be wetted, not only the contact surface is wetted, i.e. the surface area that comes into contact with the glass during shaping, but also adjacent areas of the tools can be wetted, which are also subject to high thermal loads. This is advantageous because corrosion can be avoided by the oil. According to a preferred embodiment, the vertical angle between the nozzle and the inner forming tool is 0°, and the horizontal angle is 45°. A lateral spacing between the spray nozzle during the spraying operation and the surface of the inner forming tool is preferably in a range from 1 to 50 mm. A spacing in the range from 10 to 30 mm has been found to be particularly advantageous.

According to one embodiment of the invention, the spray nozzle may be fixedly installed in the apparatus, i.e. the distance from the spray nozzle to the surface of the forming tool to be spray-coated is constant. In this case, the spray nozzle may be integrated in the shaping station or in an external forming tool, for example. Attachment thereof below an outer forming tool is possible as well.

Alternatively, it is likewise possible for the spray nozzle to be not installed in stationary manner in the shaping station or in one or more further forming tool(s), but to be adapted to be driven towards or close to the mandrel in the intermediate clock cycles of the shaping process. Here, intermediate clock cycle is understood to mean the time interval between two shaping processes.

The spray duration of the spray nozzle is variably adjustable and can be adapted to the machine's clock cycle, for example. The amount of dispensed oil is adjusted through the spray duration. In particular in combination with the geometrical arrangement of the spray nozzle, this ensures a complete, uniform and reproducible application of the minimum amount of oil. According to one embodiment, the duration of a spray burst for spray-application of the oil is less than 0.5 s, preferably less than 0.3 s, or less than 0.2 s. The respective duration depends on the machine's clock cycle. Preferably, a spray burst has a duration of at least 0.1 s in order to ensure uniform opening of the valves. According to one embodiment, the duration of a spray burst or spraying operation is therefore between 0.1 and 0.5 s, preferably between 0.1 and 0.2 s.

Coaxial spray nozzles have been found to be particularly advantageous in this context, but other spray nozzles, such as annular nozzles, can be used as well, in principle. In addition to the parameters 'amount of lubricant' and 'spray duration', coaxial spray nozzles allow to influence the settings for the jacket air and hence the spray pattern. For example, the distribution of the oil film on the surface of the forming tool can be controlled through the spray duration of the jacket air. With increasing spray duration it is possible, for example, to increase the opening angle of the oil film by the jacket air. In this manner it is possible to achieve a particularly accurate and even distribution of the oil.

In case of the minimum quantities used, this is of particular importance. After spray-application of the oil, pure spray air can be sprayed so as to further improve the distribution on the surface of the forming tool.

According to one embodiment of the invention, lubrication of the rollers is also achieved using such a minimum lubrication system.

According to one refinement of the invention, the apparatus has at least two spray nozzles for each forming tool. As a result, oil distribution is further improved and each of the two spray nozzles has to dispense only half of the amount of oil as specified for a device comprising one spray nozzle.

In particular by combining an inner forming tool that exhibits good heat dissipation and the inventive arrangement of the one or more spray nozzle(s) relative to the surface of the inner forming tool, it is possible to achieve the minimum lubrication and to eliminate the drawbacks known from prior art conventional lubrication. According to one embodiment, the amount of oil dispensed per forming step and application instance can be reduced to less than 0.01 g, less than 0.005 g, or even less than 0.001 g. This corresponds to a reduction in the amount of supplied oil by more than two orders of magnitude compared to the prior art.

In this case, in a preferred embodiment of the apparatus, the areas of the respective shaping surface, in particular the contact surface and preferably also an area of a frustoconical portion of the inner forming tool, i.e. of the mandrel, which come into contact with the glass of the workpiece during the shaping, can each be provided with a respective full-surface oil-containing covering layer.

Advantageously, the covering layer may have a thickness in a range of up to not more than 750 μm, preferably up to not more than 75 μm, and particularly preferably the covering layer may comprise only one or only up to ten molecular monolayers of the oil.

Furthermore, the invention relates to a method for shaping a workpiece implying minimum lubrication for the wetting of forming tools. Here, the method comprises at least the method steps of heating the workpiece until softening, and shaping the outer and inner lateral surfaces of the workpiece using at least one forming tool in at least one forming step. Preferably, in this case, the workpiece is shaped by an inner and an outer forming tool. The workpiece is preferably provided in the form of tubing, in particular as a tube of circular or ellipsoidal cross-sectional shape.

The workpiece is first heated to a temperature around the shaping temperature and is shaped by coming into contact with the forming tool. Preferably, for shaping, an inner forming tool is introduced into the workpiece, and an outer forming tool is engaged on the workpiece such that the workpiece is shaped. The inner forming tool is preferably in the form of a mandrel in this case.

According to a variation of the inventive method, the surface temperature of the forming tool is not more than 300° C. even during the forming or reshaping process, i.e. even when being in contact with the heated workpiece. A temperature that is particularly advantageous on the contact surface during the shaping process has been found to be lower than the evaporation temperature and/or than the flash point of the oil that is used. Here, contact surface of the forming tool is understood to mean that surface of the forming tool, in particular of the mandrel, which comes into contact or may come into contact with the material to be formed, in particular the glass, during the shaping. To come into contact is understood to mean not a direct mechanical contact in this case, rather it is taken into account that a film of the spray-applied oil and at least one molecular monolayer of the spray-applied oil will be located between the contact surface and the material to be shaped, in particular the glass.

This can advantageously be achieved by the design of the forming tool, which allows efficient dissipation of heat from the surface of the forming tool. According to one embodiment of the invention, heat dissipation is accomplished in passive manner. In this embodiment, the forming tool, in particular the inner forming tool, is made of a material, entirely or at least partially, which exhibits high thermal conductivity, for example of copper. Alternatively or additionally, active heat dissipation may be accomplished as well. In this case, the forming tool, for example a mandrel, can be flushed by a cooling medium in regions thereof, for example a cooling liquid, in particular during the forming step.

In general, the temperature on the contact surface of the forming tool is less than 250° C., preferably less than 200° C. during the shaping process.

During the shaping, the surface of the forming tool or mandrel, at least the shaping or contact surface, is preferably completely covered with an oil as a lubricant. In the context of the invention, complete surface covering is understood to mean covering with at least one molecule monolayer of oil, which is also referred to as a molecular monolayer, on the contact surface of the forming tool, i.e. the contact surface of the mandrel.

In this case, the temperature of the contact surface of the forming tool, in particular the contact surface of the mandrel, during the shaping process is preferably lower than the evaporation temperature and/or than the flash point of the oil that is used, preferably lower by 10° C. than the evaporation temperature and/or than the flash point of the employed oil.

The oil is applied to the mandrel's surface prior to the forming step or between two shaping operations, using at least one spray nozzle. Here, the spray nozzle is preferably designed such that a directionally stable oil-gas jet is dispensed from the spray nozzle. In this case, the oil-gas jet preferably has an opening angle of less than 1°, particularly preferably in a range from 2 to 10°, and allows to precisely apply the oil onto the contact surface or surface area of the forming tool.

According to one embodiment, the spray nozzle is arranged relative to the forming tool such that a vertical angle γ in a range from 0 to 60° is formed with the surface of the forming tool, for example the mandrel's surface, and such that a horizontal angle α in a range from 0 to 85° is formed with the surface of the forming tool.

Spray durations of the one or more spray nozzle(s) are less than 0.5 s, preferably less than 0.3 s, and most preferably between 0.1 and 0.2 s, and can be adjusted variably, so that uniform and reproducible application of the amount of oil per application instance or spray burst or machine clock cycle is guaranteed at any time. The amount of oil dispensed per machine clock cycle and forming step is preferably <0.01 g, or even <0.001 g.

The method of the invention for minimal lubrication is particularly suitable for processes that involve hot forming of glass using forming tools and which aim to minimize not only friction or adhesion of the glass to the forming tools, but also contamination of the products and the production environment. The method and apparatus of the invention are particularly useful for the manufacturing of pharmaceutical packaging such as vials, cartridges, or syringes from glass tubing.

According to the invention, a method is specified for shaping a workpiece made of glass, preferably with minimum lubrication, comprising the method steps of: heating the preferably tubular workpiece made of glass until the glass softens; shaping the workpiece using a forming tool, in particular using an apparatus for forming a workpiece made of glass as described above, in a forming step; wherein the temperature of the contact surface of the forming tool with the workpiece is kept at not more than 300° C. during the forming; and at least the contact surface of the forming tool is covered by an oil as a lubricant; wherein the oil is sprayed onto the surface of the forming tool prior to the shaping process and/or between two shaping operations, preferably using at least one spray nozzle, and wherein less than 0.1 g of oil is dispensed per forming step.

With this method, the entire reshaping or forming of the glass workpiece to be shaped can be performed in a single forming step or may as well comprise a plurality of successive forming steps, which then result in complete reshaping or forming of the formed glass workpiece.

Preferably in this method, the inner and outer lateral surfaces of the workpiece are shaped or formed by at least one inner and one outer forming tool, the inner forming tool being preferably in the form of a mandrel.

Advantageously, the method comprises ejection of oil and gas, in particular air, by the spray nozzle such that a directionally stable oil-gas jet is formed, preferably a directionally stable oil-gas jet with an opening angle of less than 1°.

In the preferred embodiments of the method, the spray nozzle is arranged such that a vertical angle γ with the mandrel surface is in a range from 0 to 60°, and so that a horizontal angle α with the mandrel surface is in a range from −85° to 85°.

Preferably, the method comprises dispensing an amount of oil per forming step and application instance, in particular per spray burst, of less than 0.005 g, and most preferably <0.001 g.

Advantageously, the duration of a spray burst in the method for spraying or spray-application of the oil is <0.5 s, preferably <0.3 s, and most preferably 0.1 to 0.2 s.

In the particularly preferred embodiments of the method, the temperature of the shaping surface or contact surface of the forming tool during the shaping process is <250° C., preferably <200° C.

Most advantageously in the method, the temperature of the forming tool or contact surface of the forming tool during the shaping process or shaping is lower than the evaporation temperature and/or than the flash point of the oil used, preferably lower by at least 10° C. than the evaporation temperature and/or than the flash point of the oil that is used.

Advantageously, in the method, heat is supplied to or removed from the inner forming tool during the shaping process by thermal conduction through solid-to-solid contact.

Alternatively or additionally, in the method, the inner forming tool, in particular the mandrel, may be flushed by a cooling medium, preferably a cooling liquid, during the shaping process.

Advantageously, in the method, the areas of the respective forming surface contacting the glass of the workpiece during the shaping, in particular of the contact surface and preferably an area of a frustoconical portion of the inner forming tool, i.e. the mandrel, can be provided with a full-surface covering layer comprising the oil.

The covering layer may have a thickness in a range of up to <75 μm and may in particular comprise one, preferably up to ten monolayers of the oil.

BRIEF DESCRIPTION OF THE DRAWINGS

The invention will now be described in more detail with reference to FIGS. 1 through 12, wherein:

FIG. 2b is a top plan view of the embodiment illustrated in FIG. 2a, i.e. in a direction opposite to that of the arrow 7 shown in FIG. 2a;

DETAILED DESCRIPTION

Figure 1:
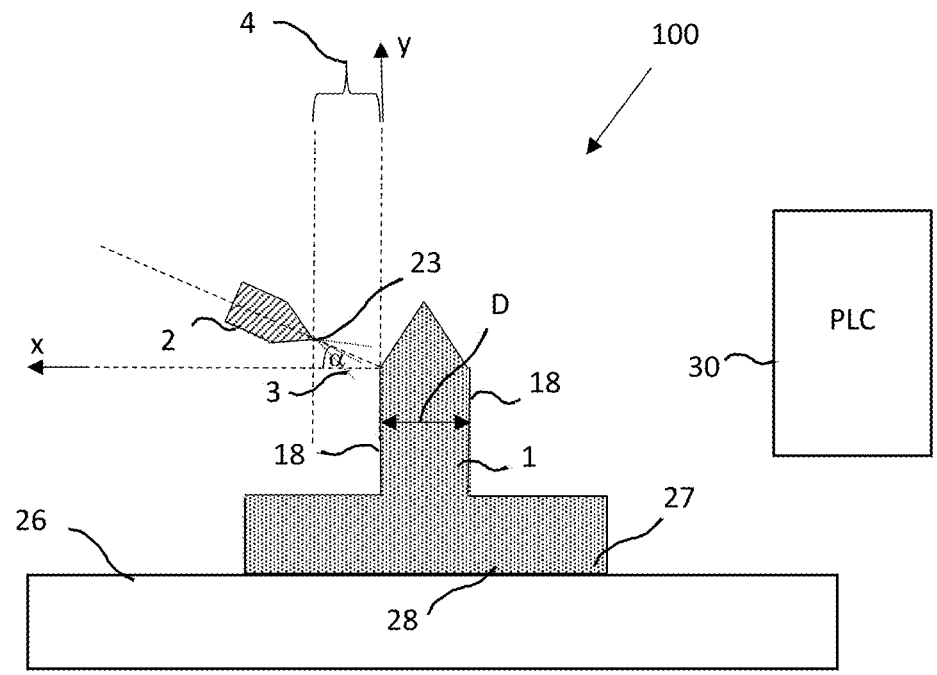
FIG. 1 is a schematic side view of the arrangement of a spray nozzle relative to a mandrel as the inner forming tool.

In the description of preferred and particularly preferred embodiments that follows, reference is made to the accompanying figures which are not drawn to scale, for the sake of clarity.

Furthermore, throughout the various disclosed embodiments, the same reference numerals designate the same or equivalent characteristics or features.

In the description of the method, the terms shaping, shaping process and forming or reshaping are used in the context of this disclosure as follows. Shaping describes the shape-defining operation for the workpiece 6, which is performed during the shaping process. Forming may in this case comprise one or more forming steps, each one achieving an at least partial shaping of the workpiece made of glass. If this shaping process is carried out until its completion, in particular until the final desired shape of the workpiece 6 is achieved, it is also referred to as forming or reshaping.

FIG. 1 schematically illustrates the arrangement of a spray nozzle 2 relative to the mandrel 1 as an inner forming tool. Mandrel 1 has a substantially cylindrical shape which tapers in frustoconical manner towards the upper end thereof. Here, the respective outer cylindrical lateral surfaces provide shaping or contact surfaces 18 for shaping the heated glass of the workpiece 6. The contact surface 18 of the mandrel 1 may have a length from 5 to 20 mm in the y-direction and a diameter D from 5 to 20 mm in its cylindrical portion. For certain embodiments of the workpiece 6 to be shaped, this diameter D may as well be only about 1 mm or even smaller. The mandrel 1 as shown in FIG. 1 is preferably made of a HSS steel, i.e. a high-speed steel. According to this embodiment, the spray nozzle 2 may be installed stationarily in the shaping station which is overall designated by reference numeral 100, and/or on the roller fixture 22, each of which supports the outer forming tools 5a, 5b for rotation but fixed in the axial direction, or may alternatively, in a non-stationary configuration, be driven by any appropriate movable device to approach the mandrel.

The shaping station 100 with its respective sensor and/or actuator modules is connected to a programmable logic controller 30, known as PLC, which stores tables and corresponding programs for sequence control, in particular of the described method steps. For the sake of simplicity of presentation, however, the respective connections between the PLC and the respective sensor and actuator modules are not explicitly shown, but will be obvious for a person skilled in the art.

During the spraying operation, the spray nozzle 2 has a distance 4 by which it is spaced from the surface, in particular the contact surface 18 of the mandrel 1, and this spacing 4 is measured from the opening 23 at the head of spray nozzle 2 during the spraying operation to the contact surface 18 in the lateral direction, i.e. in the direction opposite to the arrow designated x, and is also referred to as a lateral spacing. Lateral spacings between the opening of spray nozzle 2 and the contact surface 18 in a range from 1 to 50 mm, in particular in the range from 10 to 30 mm have been found to be particularly advantageous here. In y-direction, the height level of the respective nozzle 2, 2a, 2b can be chosen such that the opening 23 of the respective nozzle 2, 2a, 2b is slightly above or within the range of the respective contact surface 18 of the mandrel 1, so that a full-surface application of oil at least onto the respective contact surface 18 and the areas 47 is ensured.

Depending on the structural dimensions, the respective nozzle 2, 2a, 2b may as well be arranged below the respective contact surface 18 as seen in the x-direction, in particular if negative angles $\alpha$ are used.

The angle $\alpha$ describes the angle of the spray nozzle's orientation horizontally to the mandrel's surface, i.e. relative to the axis designated by x and represented by an arrow x. The spray nozzle's orientation can be seen more easily in the more detailed view of FIG. 5 and substantially corresponds to the direction of the arrows shown in FIG. 5 and thus essentially to the longitudinal orientation of the air passages 11a, 11b, oil supply line 12, and air passages 13a, 13b, which are aligned in parallel to each other all extending to the exit direction of the resulting oil-air jet 14.

According to a preferred embodiment, angle $\alpha$ is from 0 to 85°, preferably from 30 to 50°, most preferably 45°. Such an arrangement of the spray nozzle 2, 2a, 2b during the spraying operation also allows, by using the small quantities of oil according to the invention, to uniformly and completely wet or cover the surface of the mandrel by the spray jet 3. Depending on the structural dimensions of the shaping station 100, it is even possible to set a negative angle $\alpha$, which may, for example, be up to −85°, when the nozzle 2, 2a, 2b is arranged below the inner forming tool 1.

In all preferred embodiments, the spray jet 3 is always adjusted, in particular aligned such that preferably each spray burst and preferably using spray air sprayed after each spray burst achieve full-surface wetting or covering by the applied oil of at least the respective forming tool surfaces, in particular contact surfaces 18, and preferably of the area 47 of the frustoconical portion 46 of the inner forming tool or mandrel 1 that will be described in more detail below.

Figure 2A:
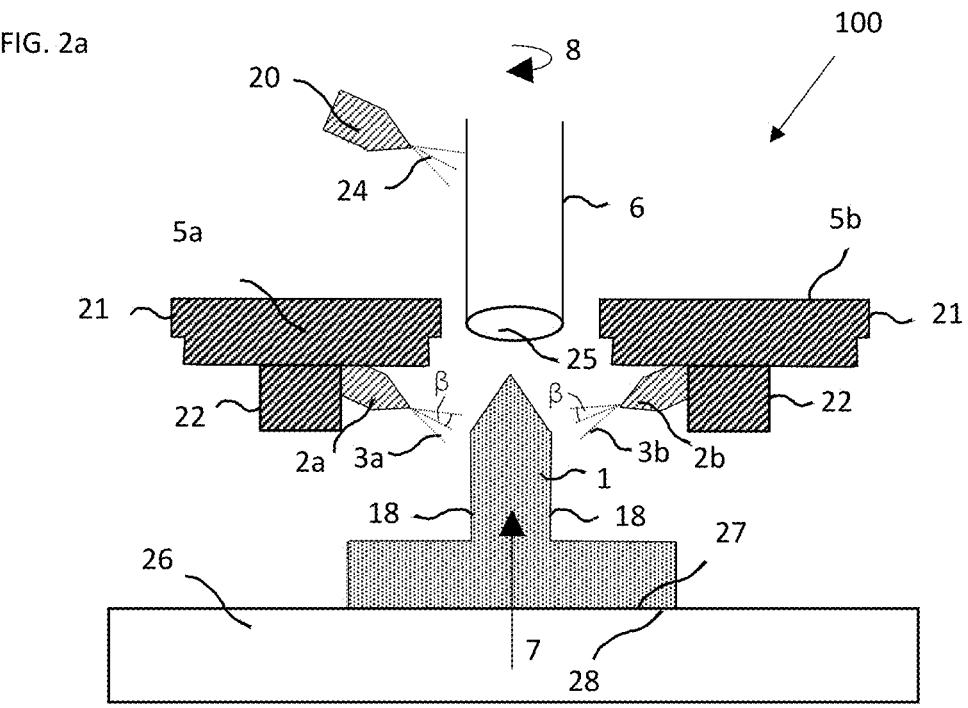
FIG. 2a is a schematic side view of a preferred embodiment of the apparatus, which furthermore shows further forming tools, in particular outer forming tools that are used for shaping an outer contour of the workpiece to be formed.
Figure 2B:
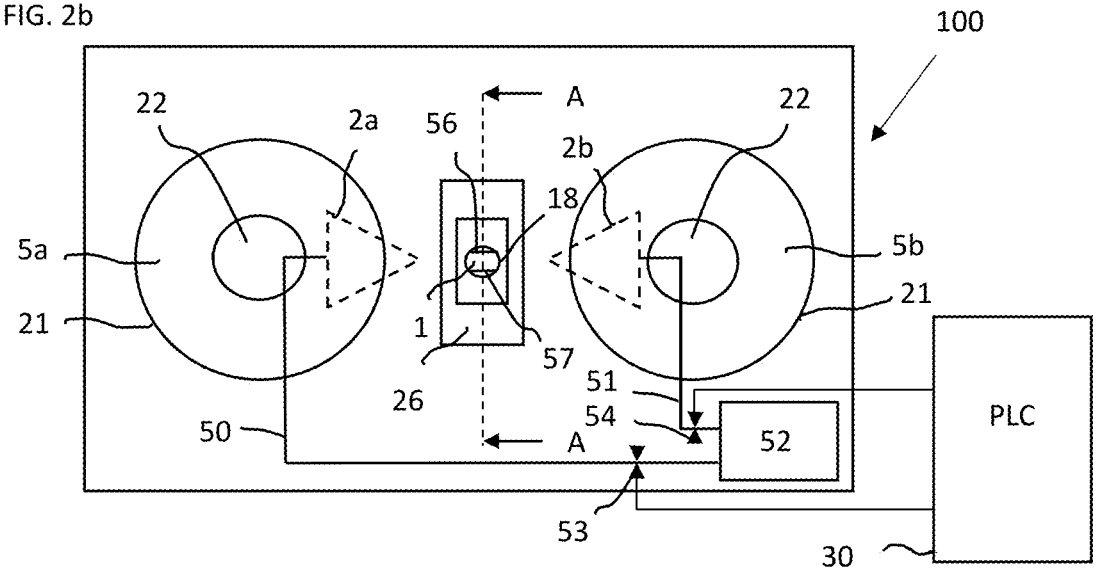

FIGS. 2a and 2b schematically illustrate an embodiment of the shaping station. FIG. 2a shows a side view of the apparatus. In addition to the mandrel 1 as an inner forming tool, the apparatus comprises the two outer forming tools 5a and 5b which are configured as shaping rollers.

Each of shaping rollers 5a, 5b preferably is a cylindrically symmetrical disk having the shaping surface 21 in the region of the lateral surface thereof, which is adapted for contacting the glass. The contour of the shaping surface typically corresponds to a section of the contour of the glass workpiece 6 to be produced, in particular a glass container. Each of shaping rollers 5a, 5b is typically made of a highly heat-resistant material such as steel, at least in the area of the shaping surface, while portions thereof may as well be made of aluminum, and is supported for rotation about its respective axis of symmetry, i.e. the axis of cylindrical symmetry.

In the embodiment shown, two spray nozzles 2a and 2b are fixedly attached to the roller fixtures 22 of outer forming tools 5a, 5b. Spray nozzles 2a and 2b are used to wet and so lubricate, with a thin oil film, the surface, in particular contact surface 18 of the mandrel 1 in the intermediate clock cycles, i.e. between two reshaping operations. By using two spray nozzles 2a and 2b, particularly uniform wetting of the surface of the mandrel is achieved. Following the minimum lubrication, a previously heated workpiece 6 is introduced into the shaping station. The heating device 20 may comprise a burner powered with a fossil fuel, the flame 24 of which is moved over the outer surface of the workpiece 6 until the latter has the desired temperature.

At the temperature to which the workpiece 6 was heated, viscosity is from $10^{3.5}$ to $10^{5.5}$ dPa·s.

A preferred glass of which the workpiece 6 is made or of which the workpiece 6 consists, is a borosilicate glass, in particular a type 1 borosilicate glass according to USP and EP, without however limiting the method which is suitable for many, even most hot-formable glasses, or the apparatus which is suitable for many, even most hot-formable glasses.

The workpiece 6 is in the form of a glass tube. For forming or shaping, the mandrel 1 is introduced into the workpiece 6 in the direction shown by arrow 7, so that the contours of the mandrel 1 are transferred to the inner lateral surfaces 25 of workpiece 6, while the workpiece 6 rotates and the contours of the outer forming tools 5a and 5b are transferred to the outer lateral surfaces of the workpiece. In this case, the contact surfaces 18 of the mandrel 1 come into direct mechanical contact with the inner lateral surfaces or inner lateral surface 25 of the workpiece 6, while they are caused to rotate relative to the stationary mandrel 1. The velocities of the here resulting relative movements of the forming tools, in particular the inner forming tool or mandrel 1, relative to the workpiece 6 substantially correspond to the velocities conventional in hot forming and known to a person skilled in the art and did not have to be modified or specially adapted for the purposes of the invention.

Mandrel 1 as the inner forming tool is supported in or on seat 26 such that heat can be dissipated therefrom and/or, in some embodiments, even supplied thereto to accelerate heating thereof.

For mandrels 1 which do not have internal coolant passages and so are referred to as passively cooled, this can be accomplished through a heat exchange surface 27 of the mandrel 1, which is in direct mechanical contact with an associated heat exchange surface 28 of the seat 26. Through these heat exchange surfaces 27, 28, heat can be removed from and/or supplied to the mandrel 1, in particular by adjusting the temperature of the heat exchange surface 28, so that the mandrel's temperature is thereby adjustable in defined manner, in particular under control of the PLC.

The size of the respective heat exchange surfaces 27, 28 corresponded approximately to the size of the respective contact surfaces 18 and was about 0.1 to 5 cm², see FIG. 2a, for example.

The movements of mandrel 1 are indicated by arrow 7, and the movement of workpiece 6 is indicated by arrow 8. Here, arrows 7 and 8 each indicate the relative movement of mandrel 1 relative to workpiece 6.

FIG. 2b shows the apparatus described above in a top plan view, i.e. from above. Spray nozzles 2a and 2b are shown by dashed lines here, since the spray nozzles 2a and 2b are located below forming tools 5a and 5b.

As can be seen from FIG. 2a by way of example, nozzles 2, 2a, 2b each were connected to a respectively associated oil and air supply device 52, via oil and air supply lines 50, 51 which are shown only schematically in this figure. By means of electrically controllable valves 53, 54 it was possible to control both the supply of air, in particular compressed air, and of oil in time-defined manner, by programmable logic controller 30. Only for the sake of ease of understanding, not every one of the respective supply lines is shown individually, rather they will be obvious from the view of FIG. 5, for example, in which the respective air passages 11a, 11b, 13a, 13b and the oil supply line 12 connected to such supply lines can be seen in more detail. Each of these lines has a respective valve associated therewith, which is controlled by the programmable logic controller 30, but for the sake of clarity they are not explicitly shown but symbolically represented by valves 53 and 54.

Figure 5:
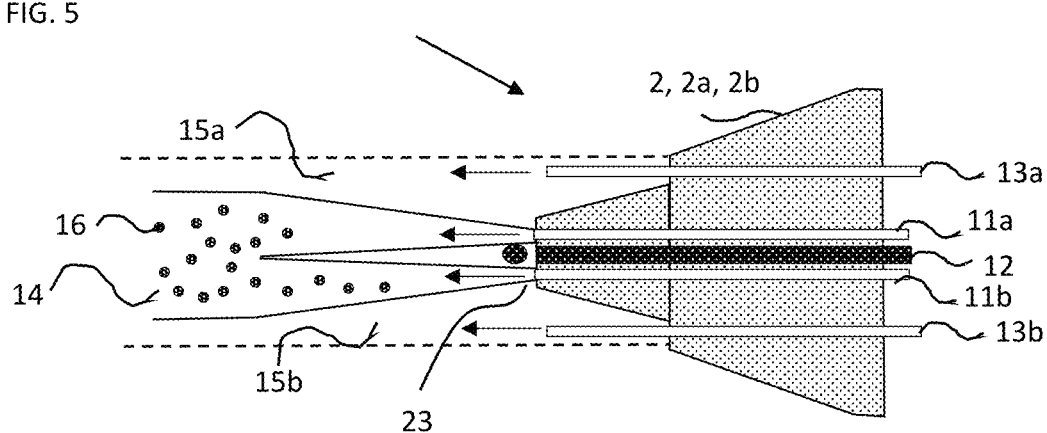
FIG. 5 is a schematic cross-sectional view of a spray nozzle illustrating the spray pattern of this coaxial spray nozzle, with the sectional plane extending through the longitudinal and symmetry axis of the spray nozzle.

Supply of the air channels 11a, 11b, 13a, 13b for the nozzle 2 as shown in FIG. 5 and for nozzles 2a, 2b was achieved with a pressure of 1 to 6 bar and did not exceed an air volume of 100 l/min. In preferred embodiments it was even possible to use air volumes of less than 10 l/min. In preferred embodiments, the effective diameter of the nozzle for the exit of air was between 0.5 mm and 3 mm. Effective diameter herein refers to the hydraulically equivalent diameter effective for the exit of the air, which in its effect corresponded in total to the air supply lines 11a, 11b, 13a, 13b. The diameter of the oil supply line 12 and the feeding pressure of the oil were each set so that the desired amount of oil could be reliably emitted during an application instance or spray burst.

With this arrangement controlled by the programmable logic controller it was possible to control, in an adjustable manner, at least one spray nozzle 2, 2a, 2b or more of these spray nozzles for applying the oil as a lubricant to the surface of the forming tool 1, with an adjustable amount of oil dispensed per forming step and application instance, i.e. per spray burst, of less than 0.1 g. For the sake of brevity and ease of readability, the spray nozzles 2, 2a, 2b are also simply referred to as nozzles in the context of this disclosure.

Figure 3:
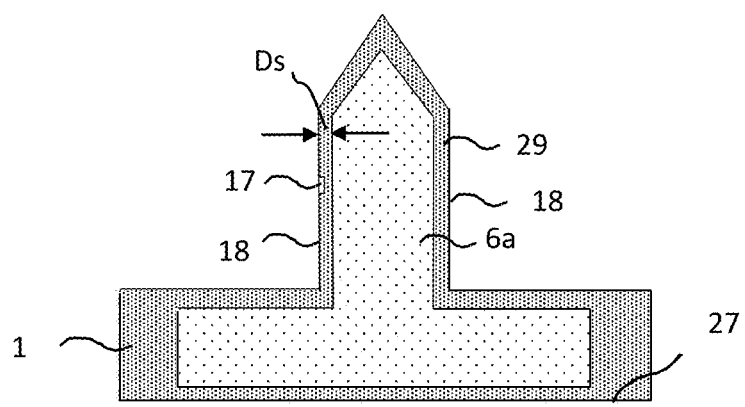
FIG. 3 is a schematic cross-sectional view of a forming tool in the form of a mandrel having a copper core, with the sectional plane extending along the sectional plane A-A as shown in FIG. 2b.

FIG. 3 is a schematic view of a mandrel 1 as an inner forming tool, which has an inner core 6a made of copper. Here, the copper core 6a allows for fast and effective heat dissipation. Alternatively, core 6a may also be made of other materials exhibiting high thermal conductivity, such as copper alloys, silver, or silver-containing alloys. This type of cooling through thermal conduction in the solid body of mandrel 1 is generally referred to as passive cooling in the context of this disclosure.

The further portion 29 of mandrel 1 surrounding the copper core 6a is also made of a HSS steel. The thickness Ds of this further portion 29 is less than 1 mm within the area below contact surfaces 18, see for example FIG. 3, in preferred embodiments less than 0.5 mm, and preferably more than 0.2 mm.

In the described embodiments with passive cooling, the forming tool fixtures or seats of the forming tools, in particular of the inner and outer forming tools, are cooled.

As a result, the cooling circuit remains closed at all times and leaking of coolant is prevented. Indirect or passive cooling is designed such that minimal amounts of oil do not evaporate on the forming tools, and so adequate lubrication is guaranteed for separating the hot glass from the forming tools. Due to the use of minimal amounts of oil, deposits on the forming tools are reduced, which increases the forming tool's service life from 2 h to 8 h and reduces production interruptions. This moreover results in less startup losses. The reduction of deposits also leads to a lower spread of dimensional deviations or product contamination.

For cleaning purposes, the forming tools can be exchanged using a quick-release pin, as illustrated by way of example in FIGS. 6 and 9 and 10, and as will be described in more detail below, so that machine downtime is reduced.

The passively cooled system is configured such that no pneumatic hoses or coolant hoses need to be disassembled.

In mandrel 1, the heat is dissipated through a copper core 6a, for example, or through another material of good thermal conductivity in the interior of mandrel 1. In this case, the inner forming tool, in particular the mandrel 1, preferably has a core 6a which comprises a material exhibiting a thermal conductivity of at least 400 W/mK, and/or copper.

In preferred embodiments which will be described in more detail further below, the forming tool 1 is easily disconnected from its seat 26 which also serves as a heat sink. The indirect cooling thereby allows easy removal and replacement of the respective tool, in particular the mandrel 1, especially since no cooling ports are directly attached thereto.

Figure 4:
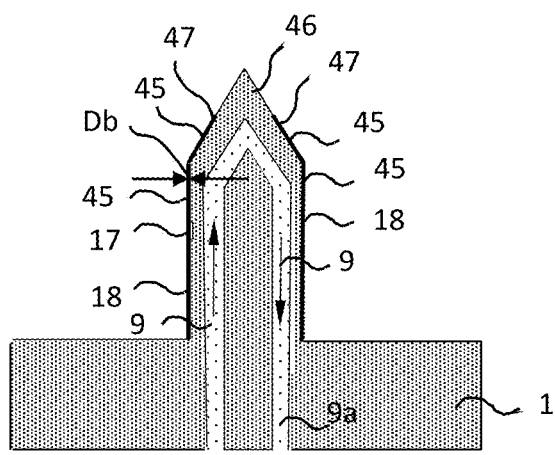
FIG. 4 is a schematic cross-sectional view of an actively cooled mandrel, with the sectional plane extending along the sectional plane A-A as shown in FIG. 2b.

FIG. 4 schematically illustrates an alternative embodiment of mandrel 1. The mandrel 1 shown in FIG. 4 features active cooling. For this purpose, mandrel 1 comprises a coolant passage 9a inside, through which a cooling medium flows, for example a cooling liquid. The direction of movement of the cooling medium is symbolized by arrow 9. For example water, air, an aerosol, or an oil can be used as the cooling medium. The active cooling allows the heat emitted by the hot glass of the workpiece 6 to be removed particularly effectively, and thus mandrel temperatures of less than 250° C. or even less than 200° C. can be achieved.

FIG. 5 shows a schematic view of the spray pattern of a coaxial spray nozzle 10 as used in one embodiment in the apparatus of the invention. Coaxial spray nozzles have been found to be particularly advantageous here, because the spray pattern can be significantly influenced by adjusting the jacket air that is emitted.

In addition to an oil supply line 12, the coaxial nozzle 10 as shown in FIG. 5 has four air channels 11a, 11b, and 13a, and 13b. Thus, not only oil particles 16 are emitted from the oil supply line 12 in a spraying operation, but at the same time spray air is emitted from air channels 11a, 11b, 13a, and 13b. The direction of movement during the spraying process is symbolized by the arrows. The spray air emitted from air passages 11a and 11b together with the oil dispensed from oil supply line 12 form an aerosol in the form of an oil-air jet 14.

The jacket spray air emitted from air passages 13a and 13b forms the spray air jets 15a and 15b which impart directional stability to the oil-air jet 14 emitted from the center of the nozzle and thus provide for a precise oil-air jet. The oil-air jet or spray jet 3, 3a, 3b emitted upon a spray has an opening angle β of >1° in this case. An opening angle β in a range from 3 to 6° has been found to be particularly advantageous in view of the local distribution of the oil on the mandrel, see e.g. the view of FIG. 2a with respect to the opening angle β. According to a preferred embodiment, the opening angle is 5°.

Although the oil-gas jet 14 comprises finely dispersed oil particles 16, the jacket spray air 15a and 15b at the same time prevents the aerosol from spreading in space and allows for the formation of a stable oil-air jet 14 or spray jet 3, 3a, 3b. Thus, even with small amounts of oil, precise, uniform and complete wetting of the forming tool such as a mandrel's surface, in particular of the contact surface 18, with oil is feasible. This makes it possible to reduce the amount of oil that is applied per spray stroke and forming step to less than 2 mg, without adversely affecting the lubricating effect during the reshaping process. This corresponds to a reduction of the amount of oil dispensed per forming step by more than two orders of magnitude compared to the prior art. In addition to the savings of oil, this leads to less contamination of the products and the processing equipment, which in turn implies less downtime as caused by necessary cleaning of the equipment, for example.

The distribution of the oil on the forming tool 1 can be further improved if pure spray air is sprayed subsequently to the emission of the defined amount of oil. A preferred embodiment therefore contemplates that after each completion of oil supply, the spray nozzle 2, 2a, 2b sprays pure spray air.

According to one exemplary embodiment, vials of a volume of 15 ml were continuously made on a rotary machine. The machine included a plurality of forming tools, which could be used, inter alia, for producing an inner notch of the vials, which is also referred to as a groove in the present disclosure. The oil used for minimum lubrication had a viscosity, at 40° C., of 200 to 240 mm/s and a flash point of >246° C. Each mandrel was lubricated using two fixedly installed circular spray nozzles, with a fixed horizontal spray-application or spray angle α of about 20° with a mandrel surface-to-nozzle tip spacing of 15 mm. The amounts of oil applied to the mandrels per clock cycle and spray burst were between 0.002 and 0.0002 g, with a spray duration of 0.14 s. The mandrels were actively and passively cooled to surface temperatures between 190 and 280° C. during the process.

In this case, the spray nozzles 2, 2a, 2b are preferably calibrated to a fixed flow rate, with a correction factor that takes into account the room and/or nozzle temperature, and this flow rate was always less than 0.5 g/s, although dependent on the selected machine clock cycle.

By sensing the temperature near the nozzles, for example using thermocouple 17, it is possible even during operation to calculate a correction at elevated temperature for the spray nozzles and to implement it in the associated programmable logic controller PLC. In this case, a temperature-dependent adaptation of the spray duration is effected, which ensures that in each case only the specified amounts of oil are spray-applied onto the inner forming tool 1, in particular onto the shaping or contact surfaces 18 and preferably the area 47. The method can be applied to various lubricants and is not limited to a particular oil.

Surprisingly, it has been found that a variety of oils can be used for the purposes of the invention without thereby incurring any limitation to the success of the invention.

Examples of such oils and their properties are shown in Table 1 below:

TABLE 1

| Oil | Density @ 15° C. [g/cm³] | Viscosity [mm²/s] @ 40° C. | Viscosity [mm²/s] @ 100° C. | Flash point [° C.] |
|---|---|---|---|---|
| Type 1 | 0.892 | 150.5 | 15.3 | 235 |
| Type 2 | 0.843 | 155.6 | 20 | 252 |
| Type 3 | 0.83 | 200-240 | 20-30 | 260 |

Here, the oil available under the trade name Panolin HVP was used as type 1, Panolin Orcon Vitra as type 2, and GTI as type 3.

In this case, a thickness of the oil or lubricant covering layer on at least the surfaces having glass contact, i.e. contact surface 18 and preferably the area 47, of <750 μm has proven to be advantageous.

In one of the embodiments described above, this corresponded to about 0.1 g of Panolin HVP.

In this case, the inner forming tool, in particular the mandrel 1, has a contact surface 18 of a size of typically about 0.1 cm² to 5 cm².

The inventors even assume that at least one molecular monolayer of the employed oil is sufficient to achieve the effects described herein.

In general, and independently of the respective forming tool, a most favorably adjusted spray quantity corresponded to a thickness of the covering layer of <75 μm. By way of example, this thickness of the covering layer corresponded to about 1 mg of oil per spray burst for the mandrels 1 described herein.

In further preferred embodiments, the preferred thicknesses of the covering layer for all of the forming tools used, in particular the inner forming tool, i.e. mandrel 1, included even layer thicknesses of only one or preferably only up to 10 monolayers of the molecules of the applied oil.

In further embodiments, the thickness of the covering layer was up to <750 μm, preferably up to <75 μm.

By way of example, this covering layer 45 which in each case extends over the entire surface area of the respective forming tool surface, in particular contact surface 18, can be seen from FIG. 4, and it provides a closed surface layer on the respective forming tool or contact surface 18. This covering layer 45 has the above-described covering layer thickness Db which, in a preferred embodiment, was within the limits described above of one, preferably up to ten monolayers.

Due to this very variable thickness range Db of the covering layers that can be used according to the invention, the inventors have found, most surprisingly, that the respective size of the forming tool surface, in particular of the contact surface 18 and the oil-covered area 47 of the frustoconical portion 46 of the inner forming tool, or mandrel 1, only played a very minor role.

Advantageously, it was possible in particular in all of the embodiments described herein, to provide this covering layer 45 in the same way on at least one further portion of the inner forming tool, in particular of mandrel 1, which had the above-described covering layer thickness Db, namely on the area 47 which also constitutes a forming or contact surface and extends from the respective contact surface 18 to the tip of the frustoconical portion 46 of mandrel 1, at least partially, but not necessarily reaches the tip of the mandrel 1 in all cases.

This area 47 of the frustoconical portion 46 was adequately coated with oil when all its surface areas coming into contact with the glass of the workpiece 6 to be shaped just exhibited the aforementioned thickness Db of the covering layer. However, since this area 47 depends on the respective inner diameter of the workpiece 6 prior to the shaping thereof, it was consequently possible to adapt the size of these areas 47 to the workpiece to be shaped such that the workpiece 6 only came into contact with the oil-covered areas of mandrel 1.

When the inner diameter of workpiece 6 prior to the shaping was only slightly smaller than the diameter D of the mandrel 1 or than the effective outer diameter of the mandrel 1, i.e. the radial spacing of the contact surfaces 18 effective during the shaping relative to each other, such areas 47 were correspondingly small.

In the preferred embodiments, the areas of the respective forming tool surface, in particular of the contact surface 18 and of the area 47 of the frustoconical portion 46 of the forming tools, in particular of the inner forming tool, i.e. mandrel 1, coming into contact with the glass of the workpiece 6, were in general each provided with a full-surface covering layer 45 comprising the oil. In each case, this covering layer had the covering layer thickness as described above.

Most surprisingly, the inventors found that it was essentially irrelevant which properties the lubricant had, since with the above-described temperature-dependent calibrations, the amount of oil and its density, viscosity, and volume, as well as the size of the forming tool were essentially decoupled, since, most surprisingly, already a full-surface monomolecular oil layer, in particular applied to the contact surfaces 18, was sufficient for the purposes of the invention.

The PLC stores comparison tables listing for each temperature and preferably for the particular oil used, durations and/or time intervals defining the respectively sprayed amounts of oil, which result in the above-described thicknesses of the covering layer. Based on these tables, durations or time intervals are defined for the respective actual temperature as sensed in particular by temperature sensor 17, for controlling the nozzles 2, 2a, 2b, 10, which durations ensure that the correct amount of oil is applied at least onto the respective shaping or contact surfaces.

Figure 6:
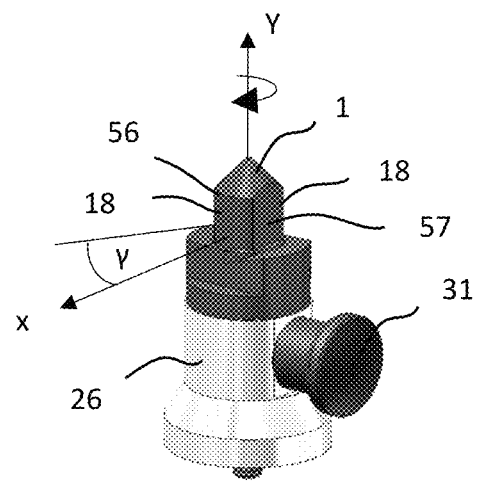
FIG. 6 is a perspective view of an embodiment of an inner forming tool, in particular a mandrel, in which the inner forming tool is supported in its operational position on an associated seat of the shaping station by a locking device, and is passively cooled.

Reference is now made to FIG. 6, which shows a plan view of one embodiment of an inner forming tool, in particular mandrel 1, in which the inner forming tool 1 is held on the associated seat 26 of the shaping station 100 in its operative position by means of a locking device, in particular by a quick-release pin 31, and is cooled passively.

In the same manner as described above for the mandrel 1 that is cooled actively through its coolant passages 9a, it is likewise possible for the seat 26 with its coolant passage 34 to be flushed by a cooling medium, preferably a cooling liquid, and arrow 35 indicates the direction of flow of the cooling medium, preferably the cooling liquid. Coolant passage 34 is only shown in phantom in FIG. 7, since it is located in the interior of seat 26 and would normally not be visible in this view. Visible, however, are the fluid ports 36 of seat 26 associated with coolant passage 34.

Figure 8:
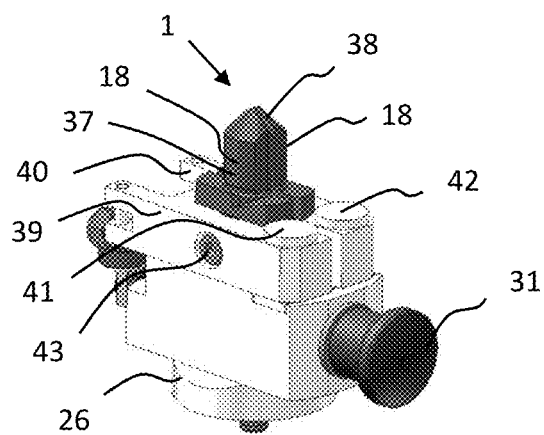
FIG. 8 is a perspective view of a further embodiment of an inner forming tool, in particular a mandrel, in which the inner forming tool in held in its operational position on an associated seat of the shaping station by a locking device, and is passively cooled, and in which the inner forming tool, in particular the mandrel, consists of two pieces.
Figure 9:
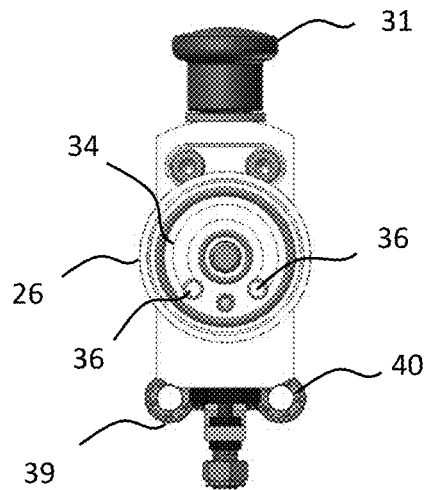
FIG. 9 is a view of the seat of the inner forming tool or mandrel of the further embodiment as seen from below, illustrating coolant passages extending within the seat.
Figure 10:
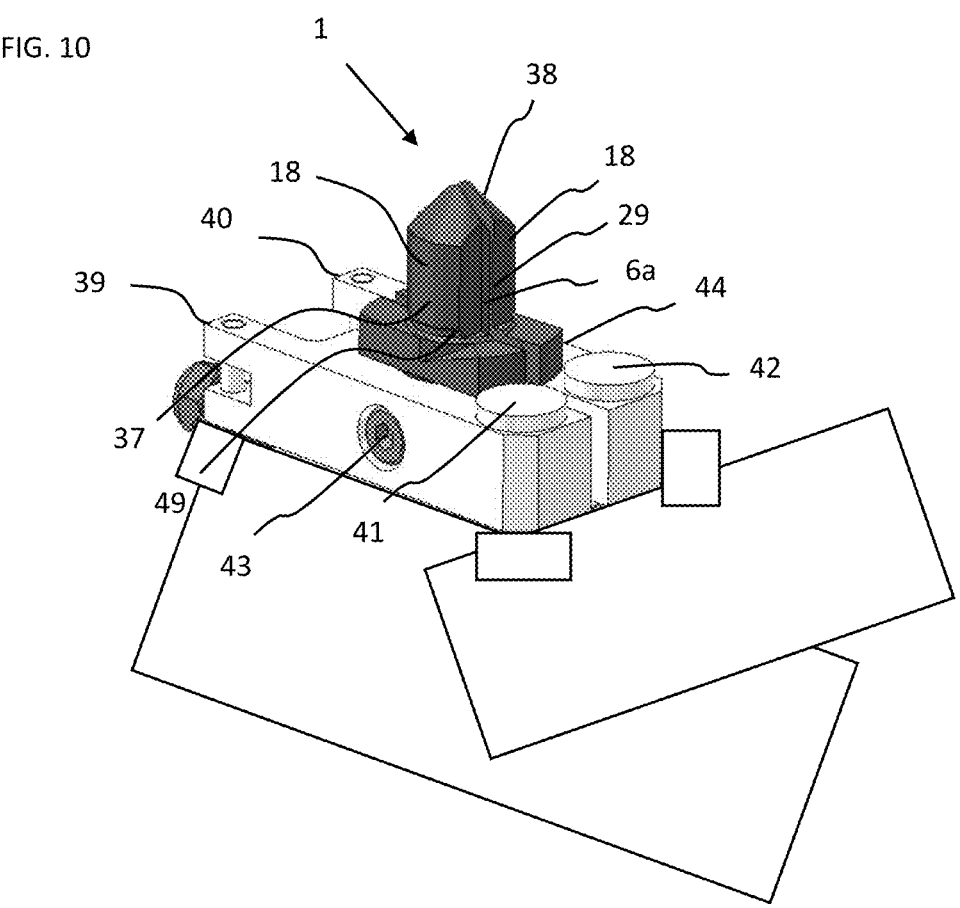
FIG. 10 is an enlarged perspective view of a detail, in particular of the upper portion of the further embodiment of the inner forming tool, in particular the mandrel, shown in FIG. 8.

FIGS. 8 to 10 show a further embodiment in which the inner forming tool, in particular the mandrel 1, consists of multiple pieces, at least two pieces, and where the effective outer diameter thereof is adjustable by relative movement of at least two halves 37, 38 of the inner forming tool, in particular of mandrel 1.

FIG. 8 shows a view of the further embodiment of the inner forming tool, in particular mandrel 1, in which the inner forming tool is held in its operative position on the associated seat 26 of shaping station 100 by a locking device, in particular by quick-release pin 31, and is passively cooled.

The two halves 37, 38 of mandrel 1 are each supported on associated arms 39, 40 which are each mounted for being pivotable laterally about an associated pivot bearing 41, 42, so that the spacing between the two halves 37, 38 of mandrel 1 relative to each other can be adjusted thereby.

By pivoting the arms 39 and 40 it is possible to adjust the effective outer diameter of mandrel 1, that is to say the distance, in particular the radial distance of contact surfaces 18 relative to each other with respect to the longitudinal axis can be adjusted, and thus the diameter effective for the shaping.

Arm 39 includes an adjustment screw 43, see for example FIG. 10, which is preferably provided with a fine thread, and a front end thereof is abutting on an adjustment screw 44 provided in the arm 40 and preferably likewise provided with a fine thread, when the arms 39, 40 are pivoted toward each other. Adjustment screw 44 is arranged in the arm 40 in the same way as adjustment screw 43 in arm 39. These adjustment screws 43, 44 allow to adjust the outer diameters of the contact surfaces 18 that are effective during the shaping in a very precise manner and durable for continuous operation.

Furthermore, a groove 49 is provided in the inner forming tool, in particular in the mandrel 1 and its two halves 37, 38, which groove can be used to formed a lip-shaped or annular peripheral elevation in the workpiece 6 to be shaped. If instead of this groove 49 an annular elevation is provided, it is possible to thereby form an annular groove in the workpiece 6. For this purpose, the two halves 37, 38 are first moved towards each other and remain in this position until the mandrel 1 consisting of these two halves has been introduced into the workpiece 6 for shaping purposes. Thereafter, the two halves 37, 38 may be slightly pivoted away from each other for shaping, so that thereby the contour of the groove 49 or of a respective elevation is transferred to the workpiece 6 to be shaped. After the forming or shaping process which may as well comprise multiple forming steps with increasing spacing of the halves 37, 38, these halves 37, 38 are pivoted back towards each other and can be removed from or retracted out of the shaped workpiece 6 without causing any damage or modification of the shaped inner surface of the workpiece 6.

Figure 7:
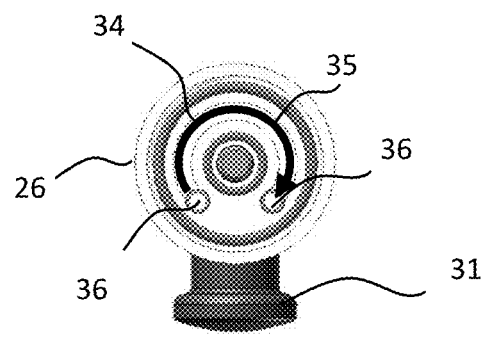
FIG. 7 is a view of the seat of the inner forming tool or mandrel as seen from below, illustrating coolant passages extending within the seat.

FIG. 9 shows a view of the seat 26 of the inner forming tool or mandrel 1 according to the further embodiment as seen from below, in which a coolant passage 34 can be seen with the fluid ports 36 thereof and extending within seat 26, as it has already substantially been explained with reference to FIG. 7.

Temperature sensing was accomplished by thermocouples 17 that were soldered into the mandrels 1 near the surface thereof, as described above. Optical monitoring of the dimensions of the vial revealed stable manufacturing within the product specifications. Nearly no smoke development was visible during production, the contamination of surrounding installation areas was greatly reduced. The forming tools 1 lubricated and cooled below the flash point of the oil exhibited no residues of oil combustion or crack residues, even after a long system runtime of several hours.

LIST OF REFERENCE NUMERALS

| | |
|---|---|
| 1 | Inner forming tool/mandrel |
| 2 | Spray nozzle |
| 2a, b | Spray nozzle |
| 3 | Spray jet |
| 3a, b | Spray jet |
| 4 | Spacing |
| 5 | Forming tools |
| 5a, b | Forming tools |
| 6 | Workpiece |
| 6a | Inner core of mandrel |
| 7 | Arrow indicating movement direction |
| 8 | Arrow indicating movement of mandrel |
| 9 | Arrow indicating movement of liquid |
| 9a | Coolant passage |
| 10 | Coaxial spray nozzle |
| 11a, b | Air passages |
| 12 | Oil supply line |
| 13a, b | Air passages |
| 14 | Oil-air jet |
| 15a, b | Spray air jet |
| 16 | Oil particles |
| 17 | Thermocouple |
| 18 | Contact surface |
| 19 | Arrow indicating direction of view |
| 20 | Heating device |
| 21 | Shaping surface |
| 22 | Roller fixture |
| 23 | Opening at head of spray nozzle 2 |
| 24 | Flame of device 20 |
| 25 | Inner lateral surface of workpiece 6 |
| 26 | Seat of inner forming tool |
| 27 | Heat exchange surface of mandrel 1 |
| 28 | Heat exchange surface of seat 26 |
| 29 | Further portion of mandrel 1 |
| 30 | Programmable logic controller |
| 31 | Quick-release pin |
| 34 | Coolant passage |
| 35 | Arrow indicating flow direction |
| 36 | Fluid port |
| 37 | Half of two-piece mandrel 1 |
| 38 | Half of two-piece mandrel 1 |
| 39 | Arm for supporting half 37 |
| 40 | Arm for supporting half 38 |
| 41 | Pivot bearing |
| 42 | Pivot bearing |
| 43 | Adjustment screw |
| 44 | Adjustment screw |
| 45 | Covering layer |
| 46 | Frustoconical portion of forming tool |
| 47 | Oil-covered area of inner forming tool |
| 49 | Groove in inner forming tool |
| 50 | Oil and air supply line |
| 51 | Oil and air supply line |
| 52 | Supply device for supplying oil and air |
| 53 | Electrically controllable valve |
| 54 | Electrically controllable valve |
| 56 | Flattened area of inner forming tool |
| 57 | Flattened area of inner forming tool |

What is claimed is:

1. An apparatus for shaping a workpiece made of glass, comprising:
   a heating device configured to heat the workpiece;
   a shaping station with a forming tool, the forming tool having a contact surface that is configured to shape the workpiece, the forming tool is configured with a heat dissipation such that a temperature of the contact surface during shaping of the workpiece is below 300° C.; and
   a spray nozzle configured to apply an oil as a lubricant onto the contact surface of the forming tool, wherein the spray nozzle provides a jacket gas spray emitted from the spray nozzle parallel to an oil-gas jet, and is configured and controlled, to dispense an amount of the oil that is less than 0.1 grams and provide a full-surface covering layer on the contact surface.

2. The apparatus of claim 1, wherein the forming tool comprises an inner forming tool and an outer forming tool, the inner forming tool having an inner contact surface configured to shape an inner lateral surface of the workpiece, and the outer forming tool having an outer lateral surface configured to shape an outer lateral surface of the workpiece.

3. The apparatus of claim 2, wherein the inner forming tool is a mandrel.

4. The apparatus of claim 1, wherein the spray nozzle is configured and controlled to apply the oil to the contact surface in intermediate clock cycles of the shaping process.

5. The apparatus of claim 1, wherein the spray nozzle is configured and controlled so as to provide a characteristic selected from a group consisting of: a directionally stable oil-gas jet, a vertical angle γ with the contact surface in a range from 0 to 60°, a horizontal angle α with the contact surface in a range from −85° to 85°, and any combinations thereof.

6. The apparatus of claim 5, wherein the directionally stable oil-gas jet has an opening angle selected from a group consisting of: greater than 1°, in a range from 2 to 10°, and in a range from 2 to 6°.

7. The apparatus of claim 1, wherein the heating device, shaping station, and spray nozzle are configured for the workpiece shaped as a tubular workpiece.

8. The apparatus of claim 1, comprising a lateral spacing between the spray nozzle and the contact surface of 1 to 50 mm.

9. The apparatus of claim 1, wherein the spray nozzle is a coaxial spray nozzle.

10. The apparatus of claim 1, wherein the spray nozzle comprises a plurality of spray nozzles per forming tool.

11. The apparatus of claim 1, wherein the spray nozzle is installed in the shaping station in a stationary manner or is installed in the shaping station a non-stationary manner so that the spray nozzle is driven towards or close to the forming tool in an intermediate clock cycle of the shaping process.

12. The apparatus of claim 1, wherein the amount of oil is less than 0.01 grams.

13. The apparatus of claim 1, wherein the spray nozzle is configured to apply the oil in a spraying process with a duration of less than 0.5 seconds.

14. The apparatus of claim 1, wherein the temperature is below 250° C.

15. The apparatus of claim 1, wherein the temperature is lower than an evaporation temperature and/or a flash point of the oil.

16. The apparatus of claim 1, wherein the forming tool comprises a material exhibiting a thermal conductivity of at least 400 W/mK.

17. The apparatus of claim 1, wherein the forming tool comprises copper.

18. The apparatus of claim 1, further comprising a seat that holds the forming tool such that heat can be removed therefrom and/or supplied thereto through a heat exchange surface of the forming tool that is in direct mechanical contact with an associated heat exchange surface of the seat.

19. The apparatus of claim 18, wherein the forming tool is releasably supported on the seat by a locking device.

20. The apparatus of claim 1, wherein the forming tool comprises two pieces, and wherein the forming tool has an effective outer diameter that is adjustable by relative movement of the two pieces.

21. The apparatus of claim 1, wherein the forming tool comprises a coolant passage configured to receive a cooling medium to cool the forming tool.

22. The apparatus of claim 1, wherein the full-surface covering layer of the oil on the contact surface has a thickness of less than 750 μm.

23. The apparatus of claim 1, wherein the full-surface covering layer of the oil on the contact surface has from one up to ten molecular monolayers of the oil.

24. An apparatus for shaping a workpiece made of glass, comprising:
    a heating device configured to heat the workpiece;
    a shaping station with a forming tool having a contact surface that is configured to shape the workpiece, the forming tool has a heat dissipation such that a temperature of the contact surface is below 300° C. during shaping of the workpiece; and
    a spray nozzle configured to apply an oil onto the contact surface, the spray nozzle comprises a center with an oil supply line and air supply passages that generate an oil-air jet and comprises air jets external to the center that emit air in parallel to each other and to the oil and that impart directional stability to the oil so as to provide a full-surface covering layer of the oil on the contact surface with an amount of the oil that is less than 0.1 grams.

* * * * *